3,629,112
AQUEOUS LUBRICATING COMPOSITIONS CONTAINING SALTS OF STYRENE-MALEIC ANHYDRIDE COPOLYMERS AND AN INORGANIC BORON COMPOUND
Howard D. Gower, Munster, Ind., and Bob G. Gower, Park Forest, and David Young, Homewood, Ill., assignors to Atlantic Richfield Company
No Drawing. Continuation-in-part of application Ser. No. 712,965, Mar. 14, 1968. This application Nov. 25, 1968, Ser. No. 778,804
Int. Cl. C10m 3/22, 1/28
U.S. Cl. 252—34.7
5 Claims

ABSTRACT OF THE DISCLOSURE

Aqueous cooling compositions, suitable for use in metal working, are prepared which contain a minor amount of a water-soluble salt of a copolymer of styrene and maleic anhydride or a partial ester thereof, or a water-soluble partial ester of the copolymer, together with a minor amount of boric acid or other boron compound which yields boric acid on hydration. Improvement in lubricating properties of the composition are realized by incorporating a minor amount of a water-soluble extreme pressure agent such as an organic phosphate ester or water-soluble or dispersible soaps of fats, fatty acids or derivatives thereof.

This application is a continuation-in-part of application Ser. No. 712,965, filed Mar. 14, 1968, now abandoned.

This invention relates to an improved aqueous composition suitable for use as metal-working lubricant fluid. More particularly, the invention relates to water-base fluids for use in cutting, drilling, reaming, grinding, tapping and other machining and forming operations of ferrous and non-ferrous metals.

Lubricants suitable for use in metal fabrication such as in cutting, threading, tapping and the like, must effectively cool and lubricate both the tool and the worked metal. During such operations an enormous amount of heat is generated at the interface of the tool and work piece which must be quickly dissipated in order to prevent damage to either the tool or work piece or both. This is accomplished by flooding the interface with a fluid having a high capacity for heat adsorption as well as effective lubricating properties for reducing friction between the tool and work piece. The lubricants especially formulated for these purposes are known in the art as cutting fluids or cutting oils.

Now in accordance with the present invention it has been found that water-based cutting fluids with good lubricating properties can be provided by adding a water-soluble salt of a styrene-maleic anhydride copolymer or such salts of half-esters of said copolymers or the water-soluble half-esters themselves, along with boric acid or other inorganic boron compounds which yields boric acid on hydration. The styrene-maleic anhydride copolymer component and boric acid components can be added to the composition in minor amounts, sufficient to effect improved lubricating properties and provide good dispersion of the additives in the water of the base cutting fluid. Generally, such compositions contain a substantial amount of water, for use as a cutting fluid, and the water is frequently about 20 to 95 parts by weight, preferably about 25 to 70 parts by weight. Suitable amounts of the styrene-maleic anhydride copolymer component include about 2 to 40 parts by weight, preferably about 8 to 20 parts by weight. The amount of boric acid or said boron compounds can be, for example, about 0.1 to 15 parts by weight, preferably about 3 to 10 parts by weight. These parts by weight designations are based on the total of these water, copolymer and boric acid components.

The styrene-maleic anhydride resin is a copolymer of about 1 to 5 moles of styrene per mole of maleic anhydride and has a molecular weight of about 700 to 80,000, preferably, about 700 to 3,000. The partial esters which can be employed are often up to about 100% or more half-esters of the styrene-maleic anhydride copolymer, that is the copolymer has up to about 50% or more of the total number of carboxyl groups esterified, and are preferably about 25 to 60% half-esters. The esterifying alcohols with which the copolymer can be reacted to form the partial esters include the water-soluble alcohols and capped glycols corresponding to the general formula:

$$R\text{—}(O\text{—}R')_x\text{—}OH$$

wherein R and R' are aliphatic hydrocarbon radicals, preferably saturated, of about 2 to 6 carbon atoms, and $x=0$ to about 10 or 20 or more. The total number of carbon atoms in R and a single R' is often less than about 7. Uncapped glycols having molecular weights of about 200–20,000 can also be employed, however, if uncapped glycols are used, it is preferable that the styrene-maleic anhydride polymer first be "pre-esterified" to reduce its functionality and thus to preclude the formation of an insoluble ester. Thus, the resin can be esterified with an alcohol or capped glycol to form, for example, at least about 50% half-ester prior to esterifying with the uncapped glycol to form an approximate 90–100% half-ester. Suitable alcohols and glycols for use in esterifying the styrene-maleic anhydride copolymer are, for example, n-propyl alcohol, ethyl alcohol, isopropyl alcohol, t-butyl alcohol, isoamyl alcohol, capped polyethylene glycols, e.g., polyethylene glycol monobutyl ether, capped polypropylene glycols, etc.

Preparation of the styrene-maleic anhydride copolymer can be by known methods. A preferred method is by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

The water-soluble salts of the styrene-maleic anhydride copolymer resin or half-ester can be formed by reacting said resin or partial ester with alkali metal hydroxides, ammonia or water-soluble, salt-forming amines. Suitable amines which can be employed in the present invention to form the amine salts of the styrene-maleic anhydride copolymer or its partial ester are water-soluble, salt-forming amines having high molecular weights and boiling points above about 200° C. Preferred amines are tertiary amines, such as, for example, tributylamine, trifurfurylamine, and hydroxyl lower alkyl amines such as, for example, triethanolamines. Glycol amines or capped glycol amines of molecular weights up to about 5000 are also suitable. The ethanolamines are preferred.

A preferred method of reacting such amines and the copolymer is to first dissolve the amine in the water and then add the copolymer while keeping the temperature below about 140° F. to minimize evaporation. Sufficient agitation may be employed to insure complete formulation. The aqueous compositions of this invention comprising water, the water-soluble salt of a copolymer of styrene and maleic anhydride or a partial ester thereof, or a water-soluble partial ester of the copolymer, together with a minor amount of boric acid or other boron compound which yields boric acid on hydration may be employed alone as effective lubricating compositions. Alternatively the composition of this invention may also be employed in aqueous solutions containing minor, effective amounts of water-soluble, extreme pressure lubricating agents. These extreme pressure agents are generally effective in the composition of the present invention when employed in minor amounts, say from about 2 to 15 weight percent, preferably about 4 to 10 weight percent of the composition.

Extreme pressure agents which can be employed in the compositions of the present invention include, for example, the organic phosphate ester acids and can be, for instance, primary, secondary or tertiary esters of phosphoric acid and a hydroxyl compound which can be exemplified by the $C_5$–$C_{30}$ alkanols, phenols, including the alkylmonophenols, and monoalkylmonoaryl- and monoarylalkylesters of polyalkylene glycols. These phosphate compounds include those corresponding to the following general formula:

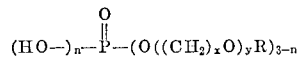

wherein R is a hydrocarbon radical having 1 to about 30, preferably about 8 to 18, carbon atoms, $x$ equals about 2 to 10, preferably 2, $y$ is 0 to about 20, preferably about 2 to 8, $n$ is 0 to 2, preferably 1 or 2. The R groups can be, for instance, alkyl, aryl or mixed alkyl-aryl radicals.

These phosphate esters of this invention may be oil or water-soluble, depending to a degree on the value of $y$, although the size of R and $x$ may also be factors in determining solubility. Generally, oil-solubility tends to increase with larger values of R and $x$, while water solubility increases with larger values of $y$, for example, above about $y=8$ to 10 the esters tend to be water-soluble while below $y=5$ they can generally be oil-soluble. In any event, where the phosphate ester is water-insoluble, a water-soluble salt-forming amine, for example, those previously mentioned can be included in the composition to react with and solubilize the phosphate ester. At least about one part by weight of amine per part of phosphate ester can often be employed to solubilize the ester in water.

Phosphate esters useful as the extreme pressure lubricant component in the present invention include, for example, trioctyl phosphate, oxo-tridecyl phosphate, mixtures of mono- and dilauryl phosphate, lauryl polyethyleneoxy phosphate esters, nonylphenylpolyethyleneoxy phosphate esters and the like. Methods of preparation of the phosphate esters suitable for use in the composition of the present invention appear in abundance in the prior art. U.S. Pat. 3,033,889 to Chiddix et al. (herein incorporated by reference), for example, discloses the preparation of phosphate esters of branched chain (Oxo) alcohols suitable as to the phosphate lubricant in the present invention. Similarly, the preparation of suitable alkyl, aryl and mixed aryl-alkyl polyethyleneoxy phosphate esters is described in U.S. Uats. Nos. 3,004,056 to Nunn et al. and 3,004,057 to Nunn, both patents being herein incorporated by reference.

It has also been found that the load carrying or extreme pressure properties of the cutting oil composition of this invention can be further improved by the addition to such compositions with or without the phosphate ester, of minor, effective amounts, often from about 0.1 to 20, preferably about 4 to 10, weight percent based on the weight of the base or undiluted fluid, of a water-soluble or water-dispersible soap of a fat, fatty acid or derivative thereof, preferably a water-soluble amine soap, such as triethanolamine soap. These amines can again be those previously mentioned in connection with the styrene-maleic anhydride copolymer component.

In use, the base cutting fluid of the invention is usually further dispersed in water and in such diluted form provides an excellent coolant and lubricant having all the aforementioned advantages for metal-working operations and, in particular reduces significantly the torque values heretofore described. The total weight ratio of water to the other components in the dispersion may often vary from about 1000/1 to 5/1 depending on the particular metal-working operation, for example, the operator may often want to use a more dilute solution for grinding than for boring and turning. Thus, for instance, a dilution of 1 part base fluid in 40 parts water may often be preferred for grinding operations involving, say, a tungsten-containing alloy steel workpiece, while a 1:20 dilution could be preferred for boring and turning operations on the same steel. Usually, the preferred ratio of water to other components will be in the range of about 100/1 to 12/1.

In addition to the styrene-maleic anhydride copolymer component, the boron compound, and, if desired, the extreme pressure agents, various additives known to be useful in cutting fluids can be included in the base composition of the present invention. These include, for example, water-and-oil coupling agents such as glycols or glycol ethers, foam and rust inhibitors, dyes, masking, bactericidal and perfuming agents, anti-corrosive agents for copper and copper alloys and the like.

As suitable rust inhibitors may be mentioned, for example, alkali metal nitrites, such as sodium nitrite, and alkylolamines such as mono-, di- and tri-alkylolamines having a total of about 5 to 15, preferably about 6 to 10, carbon atoms, such as, for instance, triethanolamine, diisopropanolamine, diethanol methanolamine, etc. These rust inhibitors can often be added in amounts between about 1 and 35% by weight of the total composition. An exemplary base cutting composition is one containing as rust inhibitors a combination of about 4 to 20, preferably about 7 to 15, weight percent of an alkali metal nitrite, and about 5 to 30, preferably about 9 to 20, weight percent of an alkylolamine. Often, the amount of amine can be that amount sufficient to maintain a slightly alkaline condition in the cutting oil. Rusting has been observed to be most effectively retarded, for instance, in cutting fluids having a pH of about 7.2 to 8.6.

In order to prevent the cutting fluid from frothing, thereby reducing the lubricating and cooling effect as well as obscuring the workpiece from the operator's view, the cutting fluid base composition can often contain a small, effective amount, say up to about 8, preferably about 0.5 to 5, weight percent of suitable foam depressants. Foam inhibitors such as the silicone oils described in U.S. Patents 2,563,588 and 2,662,055, particularly the dimethyl silicone polymers and hexadecyl alcohol or other alcohol of 6 to 20 carbon atoms are exemplary of foam inhibitors suitable for use in the cutting fluid base of the present invention.

In accordance with the present invention, cutting fluid concentrates were formulated as follows:

EXAMPLE I

| Component: | Parts by weight |
|---|---|
| Organic phosphate: (Mixture of approximately equal amounts of primary and secondary phosphate esters of the oxyethylene ether of Oxo tridecyl alcohol, the ether containing an average of 3 oxyethylene groups) | 11.6 |
| Salt of esterified copolymer: (Ammonium salt of 50% ethylene glycol monobutyl ether half-ester of styrene-maleic anhydride copolymer having mol. wt. of about 1450, molar ratio of styrene to maleic anhydride of about 1:1; 50% solids in water) | 37.6 |
| Sodium nitrite | 4.6 |
| Triethanolamine | 5.8 |
| Silicone foam inhibitor | 0.6 |
| Water | 39.4 |
| Primary hexyl alcohols | 0.3 |
| Red dye | 0.1 |
| Boric acid | 5.0 |

This formulation with boric acid was tested at a 1:10 dilution with tap water as a cutting fluid on steel. The same test was also conducted, using the same dilution on the above formulation without the boric acid. The formulation without the boric acid gave a torque value reading on steel of 311 pounds per square inch whereas the above composition of this invention gave a torque value reading of 246 pounds per square inch—a reduction of 20.8%.

It was also attempted to formulate a composition similar to the above but omitting the esterified styrene-maleic anhydride copolymer. This was unsuccessful as a precipitate was formed when the boric acid was added.

EXAMPLE II 9.1 weight percent based on the weight of the cutting fluid concentrate of a 50% aqueous solution of triethanolamine oleate was added to the cutting fluid concentrate of Example I.

Torque values were measured using this formulation at a 1:10 dilution with tap water as a lubricant for tapping steel. The same test was also conducted, using the same dilution, i.e., 1:10, on the above formulation without the triethanolamine oleate. For reference purposes torque values measured using the composition without the triethanolamine oleate were rated at 100%. Torque values of the composition of this invention, with the triethanolamine oleate, were found to be 87.8% that of the reference composition—a reduction of 12.2%.

EXAMPLE III

Other formulations of this invention are as follows:

| | A | B |
|---|---|---|
| Composition (wt.): | | |
| Styrene-maleic anhydride half-ester [1] | 15 | 10.2 |
| Triethanolamine | 20 | 13.3 |
| Water | 53 | 34 |
| Oleic acid | 5 | 6.4 |
| Borax | 5 | 9.0 |
| Hexadecyl alcohol | 2 | 3.4 |
| Diethylene glycol | | 17.8 |
| Carbitol | | 5.9 |

[1] 50% ethylene glycol monobutyl ether half-ester of styrene-maleic anhydride copolymer having a molecular weight of about 1,600 and a molar ratio of styrene to maleic anhydride of 1:1.

Surface grinder tests were performed on hard alloy cast iron using a Carborundum wheel. Results are compared in Table I using composition B of Example I at a dilution of 1 part of cutting oil lubricant to 50 parts of water and a commercial water-soluble metal cutting fluid at the same dilution.

TABLE I

| | Grind ratio [1] | |
|---|---|---|
| | Break-in run (20 passes) | Run (90 additional passes) |
| Composition: | | |
| B | 18.85 | 13.2 |
| Commercial water based cutting fluid | 17.06 | 12.73 |

[1] Grind ratio = Metal removed/wheel wear; tests were conducted at a grinding wheel speed of 2,860 r.p.m. moving the specimen back and forth for the indicated number of passes over the wheel.

We claim:

1. A fluid lubricating and cooling composition useful in metal working and having a high capacity for heat absorption consisting essentially of about 20 to 95 parts by weight water, about 0.1 to 15 parts by weight of a boric acid component selected from the group consisting of boric acid and inorganic boron compounds which yield boric acid on hydration, and about 20 to 40 parts by weight of a water-soluble styrene-maleic anhydride copolymer component selected from the group consisting of salts of the copolymer, the up to about 100 percent esterified half-esters of the copolymer, and salts of said half-esters of the copolymer, the molar ratio of styrene to maleic anhydride in said copolymer being from about 1:1 to 5:1, said styrene-maleic anhydride copolymer having a molecular weight in the range of about 700 to 80,000, the water-soluble salts of the styrene-maleic anhydride copolymer and the half-esters thereof being selected from the group consisting of the alkali metal, ammonia and water soluble amine salts thereof and said half-ester of said styrene-maleic anhydride copolymer being the ester of a water-soluble member corresponding to the general formula $$R-(O-R')_xOH$$

wherein R and R' are saturated aliphatic hydrocarbon radicals of about 2 to 6 carbon atoms and $x$ equals 0 to about 20.

2. The composition of claim 1 which contains in solution as an extreme pressure agent a minor, effecitve amount of ester of phosphoric acid corresponding to the general formula

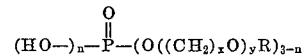

wherein R is a hydrocarbon radical having 1 to about 30 carbon atoms, $x$ equals about 2 to 10, $y$ equals 0 to about 20 and $n$ equals 0 to 2.

3. The composition of claim 2 containing about 3 to 10 parts by weight of boric acid.

4. The composition of claim 3 wherein in the formula of the ester of phosphoric acid R has about 8 to 18 carbon atoms, $y$ is about 2 to 8, $x$ is 2 and $n$ is 1 or 2.

5. The composition of claim 4 wherein the styrene-maleic anhydride copolymer component is a triethanolamine salt thereof.

References Cited

UNITED STATES PATENTS

| 2,285,853 | 6/1942 | Downing et al. | 252—49.8 |
| 2,753,305 | 7/1956 | Whitbeck | 252—49.3 X |
| 3,004,056 | 10/1961 | Nunn, Jr. | 260—980 X |
| 3,004,057 | 10/1961 | Nunn, Jr. | 260—980 X |
| 3,030,342 | 4/1962 | Trifenthal et al. | 260—29.6 H UX |
| 3,033,889 | 5/1962 | Chiddix et al. | 260—978 X |
| 3,245,933 | 4/1966 | Muskat | 260—29.6 RW |

JULIUS FROME, Primary Examiner

J. B. LOWE, Assistant Examiner

U.S. Cl. X.R.

252—33.6, 42.1, 49.3, 49.5, 49.6, 56 D; 260—29.6 H